US008140042B2

(12) United States Patent
Washiro

(10) Patent No.: US 8,140,042 B2
(45) Date of Patent: Mar. 20, 2012

(54) DISTRIBUTING APPARATUS AND METHOD FOR COMMUNICATION USING THE SAME

(75) Inventor: Takanori Washiro, Kanagawa (JP)

(73) Assignee: Sony Corporation (JP)

( * ) Notice: Subject to any disclaimer, the term of this patent is extended or adjusted under 35 U.S.C. 154(b) by 304 days.

(21) Appl. No.: 11/204,679

(22) Filed: Aug. 16, 2005

(65) Prior Publication Data

US 2006/0035585 A1 Feb. 16, 2006

(30) Foreign Application Priority Data

Aug. 16, 2004 (JP) ................................ P2004-236675

(51) Int. Cl.
*H04B 1/10* (2006.01)

(52) U.S. Cl. .................... 455/281; 333/124; 379/102.01

(58) Field of Classification Search .......... 455/280–282; 333/124, 120, 125, 128, 136; 379/90.01, 379/102.01–102.07

See application file for complete search history.

(56) References Cited

U.S. PATENT DOCUMENTS

| | | | | |
|---|---|---|---|---|
| 4,843,588 | A * | 6/1989 | Flynn | 455/186.1 |
| H1959 | H * | 5/2001 | Kikel | 342/51 |
| 6,489,859 | B1 * | 12/2002 | Tahara et al. | 333/124 |
| 6,496,886 | B1 * | 12/2002 | Osaka et al. | 710/100 |
| 6,535,090 | B1 * | 3/2003 | Matsuzuka et al. | 333/246 |
| 6,803,837 | B2 * | 10/2004 | Ishida et al. | 333/128 |
| 6,836,655 | B1 * | 12/2004 | Watler et al. | 455/411 |
| 7,123,884 | B2 * | 10/2006 | Nakakubo et al. | 455/81 |
| 2004/0233011 | A1 * | 11/2004 | Malcolm et al. | 333/81 A |

FOREIGN PATENT DOCUMENTS

| | | | |
|---|---|---|---|
| JP | 08-293707 | A | 11/1996 |
| JP | 09-246817 | A | 9/1997 |
| JP | 09246817 | A * | 9/1997 |
| JP | 2000-284007 | A | 10/2000 |
| JP | 2000-307313 | A | 11/2000 |

* cited by examiner

*Primary Examiner* — Ping Hsieh

(74) *Attorney, Agent, or Firm* — Lerner, David, Littenberg, Krumholz & Mentlik, LLP

(57) ABSTRACT

A distributing apparatus distributes a high-frequency signal received from a transmitting-and-receiving module of a first wireless terminal to transmitting-and-receiving modules of other wireless terminals with a wiring scheme. The apparatus has at least three signal transmission lines each transmitting the high-frequency signal. It also has a connecting node that connects an end of each of the signal transmission lines to each other, and an attenuator on each of the signal transmission lines and positioned near the connecting node, the attenuator on each signal transmission line attenuating the high-frequency signal on that signal transmission line. An input or output terminal of each of the transmitting-and-receiving modules of the wireless terminals is connected to any one of the signal transmission lines with a wiring scheme. One of the transmitting-and-receiving modules then transmits a communication signal. A signal obtained by attenuating the communication signal is uniformly distributed to the transmitting-and-receiving modules of the other wireless terminals through the connecting node.

8 Claims, 5 Drawing Sheets

DISTRIBUTING APPARATUS AND METHOD FOR COMMUNICATION USING THE SAME

CROSS-REFERENCE TO RELATED APPLICATIONS

The present application claims priority from Japanese Patent Application No. JP 2004-236675 filed on Aug. 16, 2004, the disclosure of which is hereby incorporated by reference herein.

BACKGROUND OF THE INVENTION

The invention relates to distributing apparatus and a method for communication using the same. More particularly, it relates to distributing apparatus and the like for transmitting a signal to or receiving a signal from transmitting-and-receiving modules of wireless terminals connected with a wiring scheme when performing an assessment and/or development of a wireless terminal or software therefor.

In a case where a wireless terminal or software for it should be assessed and/or developed, wireless terminals can be connected to each other with a wiring scheme such as using co-axial cable in order to achieve steady communication between them to keep away from being affected by any noise from outside or a reflected wave.

Distributing apparatus that divides a signal into two parts has been widely known (see pages 2 and 3 of Japanese Patent Application Publication No. 2000-307313 and FIG. 1 thereof).

In this case, such distributing apparatus has an input terminal, two distribution terminals, two branch lines each having a line length of a quarter of a set wavelength or a quarter of a set wavelength adding integral multiple of a half of the set wavelength, each of which is connected to the input terminal and the distribution terminal, and isolation resistor that is connected to the distribution terminals.

Alternatively, proposed has been a distributing apparatus that distributes a signal received at an input port thereof to plural output ports (see pages 3 and 4 of Japanese Patent Application Publication No. H09-246817 and FIG. 1 thereof).

In this case, such the distributing apparatus distributes high-frequency power to plural ports or synthesizes the power. It is composed of transmission lines that are laminated on dielectric substrate, such as slot circuit, which is formed with dielectric multilayer thin films and metal thin films, balanced lines made of parallel plates, coplanar lines, strip lines, and micro-strip lines. It has a serial distribution-in-two circuit, which is formed so that a first transmission line that is composed of slot lines or balanced lines made of parallel plates, having characteristic impedance of Z can be connected with second and third transmission lines each of which is composed of slot lines or balanced lines made of parallel plates, having characteristic impedance of Z/2. It also has a parallel distribution-in-two circuit, which is formed so that a fourth transmission line that is composed of coplanar lines, strip lines, or micro-strip lines, having characteristic impedance of Z' can be connected with fifth and sixth transmission lines each of which is composed of coplanar lines, strip lines, or micro-strip lines, having characteristic impedance of 2Z'. It further has line conversion parts, each of which connects the second or the third transmission line to the fourth transmission line that are connected between the serial distribution-in-two circuit and two parallel distribution-in-two circuits. Thus, in the distributing apparatus, one serial distribution circuit is connected to two parallel distribution circuits so that if characteristic impedance of the first transmission line is set to Z0, characteristic impedance of each of the fifth and sixth transmission lines can equal to Z0.

Additionally, proposed has been a microwave-power-distributing apparatus (see pages 3 and 4 of Japanese Patent Application Publication No. H08-293707).

This microwave-power-distributing apparatus achieves reduction in transmission loss with a waveguide configuration of its power distribution part.

As described above, in a case where a wireless terminal or software for it should be assessed and/or developed, it is necessary that the wireless terminal can receive only an electric wave from another wireless terminal without any influence of noise from the outside in order to achieve steady communication between the wireless terminals and avoid being affected by any noise from the outside or a reflected wave. It is also desirable to connect the wireless terminals to each other with a wiring scheme in order to prevent the wireless terminals from being affected by any interference between a direct wave and a reflected wave.

In the past high-frequency-power-distributing apparatus such as a Wilkinson coupler, a hybrid coupler, or their combination, however, it has been difficult to implement an assessment and development system which can make the insertion loss between the ports constant. If any past distributing apparatus and an attenuator are combined to implement an assessment and development system, which is available, not ideal, such system may have a large configuration.

For example, in a case of the above distributing apparatus disclosed in Japanese Patent Application Publication No. 2000-307313, it is difficult to implement an assessment system for wireless terminals which can distribute a signal evenly to every port. In this case, it is necessary to use a combination of the attenuator and the distributing apparatus in order to set the strength of the signal thereof to a desired value. This causes a large and complicated network system to be constructed.

Further, in a case of the above distributing apparatus disclosed in Japanese Patent Application Publication No. H09-246817, the input and output ports are specified and the insertion loss between all the ports fails to be fixed, thereby making at least three wireless terminals unavailable for assessment.

In a case where the above distributing apparatus of low loss disclosed in Japanese Patent Application Publication H08-293707 is used for assessing the wireless terminal, a receiving side may receive a distorted signal because the signal is too strong. In order to mitigate it to implement steady wireless communication, it is necessary to send to the receiving side a signal that has been attenuated by a certain level.

It is desirable to present a distributing apparatus and a method for communication using the same which can fix the insertion loss between the ports in which wireless terminals can communicate to each other under similar conditions, and by which the distributing apparatus can be made inexpensive and downsized.

SUMMARY OF THE INVENTION

According to an embodiment of the present invention, there is provided a distributing apparatus that distributes a high-frequency signal received from a transmitting-and-receiving module of a first wireless terminal to transmitting-and-receiving modules of other wireless terminals when the transmitting-and-receiving module of the first wireless terminal transmits an output signal to the transmitting-and-receiving modules of the other wireless terminals with a wiring scheme. The distributing apparatus has at least three signal transmission lines each transmitting the high-frequency signal, and a connecting node that connects an end of each of the signal transmission lines to each other. The distributing apparatus also has an attenuator on each of the signal transmission lines and positioned near the connecting node, the attenuator on each signal transmission line attenuating the high-frequency signal.

Alternatively, according to an embodiment of the present invention, there is provided a method for communication among transmitting-and-receiving modules of multiple wireless terminals with a wiring scheme. The method is carried out by using a distributing apparatus that includes at least three signal transmission lines each transmitting a high-frequency signal, a connecting node that connects an end of each of the signal transmission lines to each other, and an attenuator on each of the signal transmission lines and positioned near the connecting node, the attenuator on each signal transmission line attenuating the high-frequency signal. The method includes the step of connecting an input or output terminal of each of the transmitting-and-receiving modules of the multiple wireless terminals to any one of the signal transmission lines by cable. The method also includes the step of transmitting a communication signal from one of the transmitting-and-receiving modules of the multiple wireless terminals. The method further includes the step of uniformly distributing a signal to the transmitting-and-receiving modules of the other multiple wireless terminals through the connecting node, the distributed signal being obtained by attenuating the communication signal, thereby allowing the transmitting-and-receiving modules of the other multiple wireless terminals to receive the distributed signal under similar conditions.

In these embodiments of the present invention, at least three signal transmission lines are connected to the connecting node and an attenuator is positioned on each of the signal transmission lines. For example, the attenuators, each of which is positioned on one of the signal transmission lines, have the same attenuation. In one embodiment, the distributing apparatus further includes another signal transmission line having one end connected to the connecting node and another end connectable to another distributing apparatus for connecting the another distributing apparatus to the distributing apparatus. The distributing apparatus may also have an impedance converter provided on the another signal transmission line for connecting the another distributing apparatus to the distributing apparatus. The distributing apparatus may further have a terminator which terminates the another signal transmission line when an end of the another signal transmission line is not connected to the another distributing apparatus.

In another embodiment, each of the signal transmission lines is composed of any one of a coplanar line, a strip line, and a micro-strip line, and a ground surface is provided between each of the signal transmission lines.

In a further embodiment, the distributing apparatus has a shield case enclosing the signal transmission lines, the connecting node, and the attenuators.

According to these embodiments, the distributing apparatus has such configurations, and the attenuators may have an attenuation identical to each other. This enables the functions of distribution and/or attenuation to be shared with the signal transmission lines, thereby allowing the insertion loss in each port to be made constant, to permit each transmitting-and-receiving module of the wireless terminals to communicate under similar conditions, without discriminating between the input and output ports. By integrating the attenuators into the distributing apparatus, it is possible to provide an inexpensive and downsized distributing apparatus for an assessment and/or development system of wireless communication using multiple wireless terminals.

Thus, this invention can eliminate the complicated combination of high-frequency parts, such as the attenuators, the distributing apparatus, and the terminator, as in the past cases. According to embodiments of the invention, it is possible to construct the assessment and/or development system of wireless communication using multiple wireless terminals by merely connecting the wireless terminal to be assessed to the distributing apparatus. This enables the assessment and/or development to be instinctively implemented with ease in this distributing apparatus.

According to these embodiments, another signal transmission line that connects another distributing apparatus to the distributing apparatus is also provided. By connecting the distributing apparatuses to each other, if necessary, via a special port therefor, it is possible to increase the number of connection ports for wireless terminals without varying the attenuation.

According to these embodiments, a ground surface is provided between the signal transmission lines. This enables a reduction in any adverse effect, for example, interference between the signal transmission lines. Further, by providing a shield case for enclosing the signal transmission lines, the connecting node, and the attenuators, it is also possible to reduce any adverse effect by noise from the outside.

The concluding portion of this specification particularly points out and directly claims the subject matter of the present invention. However, those skilled in the art will best understand both the organization and method of operation of the invention, together with further advantages and the like thereof, by reading the remaining portions of the specification in view of the accompanying drawing(s) wherein like reference characters refer to like elements.

DETAILED DESCRIPTION

Figure 1:
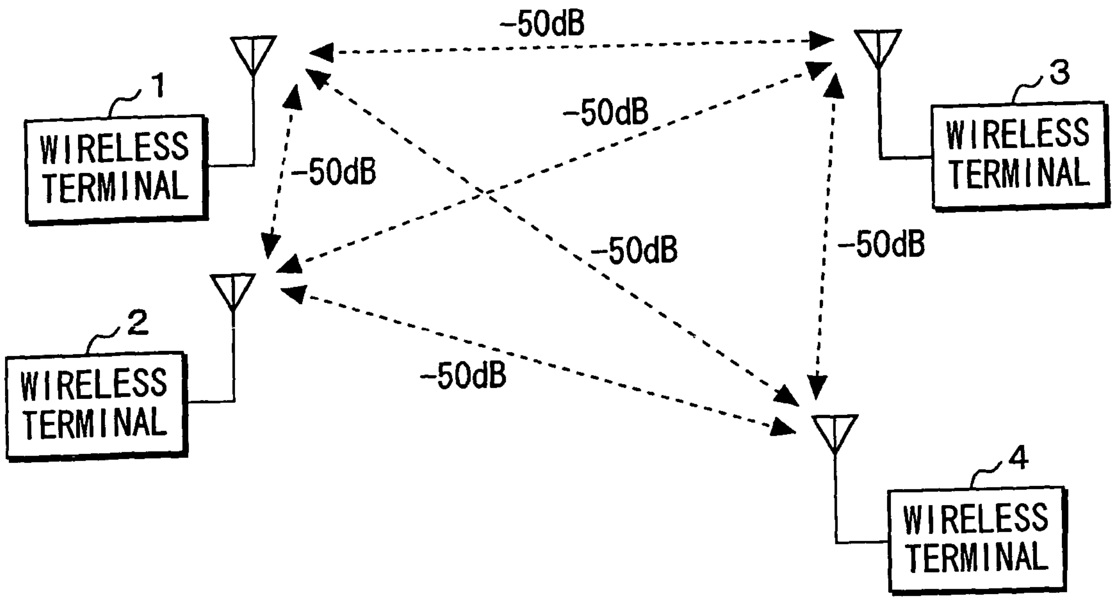
FIG. 1 (RELATED ART)
FIG. 1 is a conceptual illustration for roughly illustrating an example of a wireless communication using multiple wireless terminals.

Referring to the drawings, the invention will now be described in detail with reference to preferred embodiments of distributing apparatus and a method for communication using the same.

FIG. 1 roughly illustrates an example of a wireless communication using multiple wireless terminals. As shown in FIG. 1, transmission loss between the wireless terminals 1 through 4 may depend on a distance between the wireless terminals, a gain of antenna and the like. It is to be noted that in this embodiment, the transmission loss between the wireless terminals is illustratively set to −50 dB.

When implementing an assessment and/or development of a wireless terminal or software therefor, it is necessary to present a condition where any noise from outside is eliminated so that only electric wave transmitted by each wireless terminal may be received in order to acquire steady wireless communication for multiple wireless terminals. Alternatively, in order to eliminate any adverse effect by interference between direct wave and reflected wave, it is desirable to connect the wireless terminals to each other with wiring scheme. It is necessary to provide a distributing apparatus in which the wireless terminals are connected to each other with wiring scheme to make insertion loss in each port constant, in order to implement a communication environment like one shown in FIG. 1.

Figure 2:
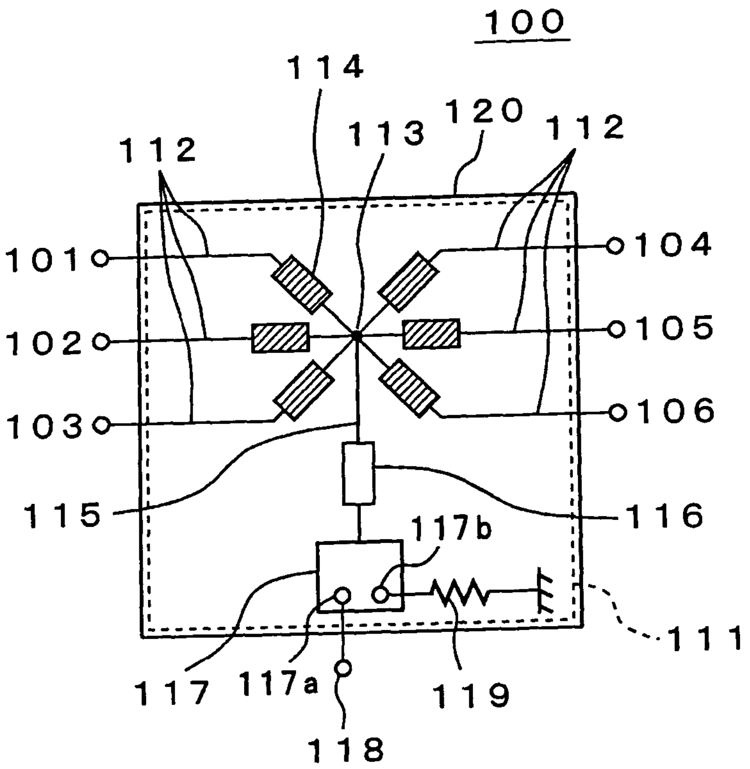
FIG. 2 is a diagram for illustrating a configuration of a first embodiment of distributing apparatus according to the invention.

FIG. 2 illustrates a configuration of a first embodiment of a distributing apparatus 100 according to the invention. In FIG. 2, the distributing apparatus 100 includes ports 101 through 106, wiring substrate 111, signal transmission lines 112, a connection node 113, attenuators 114, a signal transmission line 115 for connecting another distributing apparatus, an impedance converter 116, a switching connector 117, a port 118 for connecting another distributing apparatus, a terminator 119, and a shield case 120.

Each of the ports 101 through 106 is used for connecting the distributing apparatus 100 to each wireless terminal via a co-axial cable 130. Using these six ports allows the distributing apparatus 100 to connect six wireless terminals. Each of the ports 101 through 106 connects the signal transmission line 112.

The signal transmission lines 112 are wired on the wiring substrate 111. Each of the signal transmission lines 112 has characteristic impedance of 50Ω. Each of the signal transmission lines 112 is composed of coplanar line, strip line, or micro-strip line. A ground surface is provided between the signal transmission lines 112. This allows any adverse effect due to interference in the signal transmission lines 112 or the like to be reduced. The connection node 113 is used for connecting the six signal transmission lines 112 and the signal transmission line 115 for connecting another distributing apparatus to each other. A communication signal is distributed to each transmission line through the connection node 113.

Each of the attenuators 114 is composed of one or more chip resistor. The attenuator 114 is serially connected to each of the signal transmission lines 112. In this case, an end of each of the attenuators 114 is connected to the connection node 113. The attenuators 114 are set to have their attenuation identical to each other.

Figure 3A:
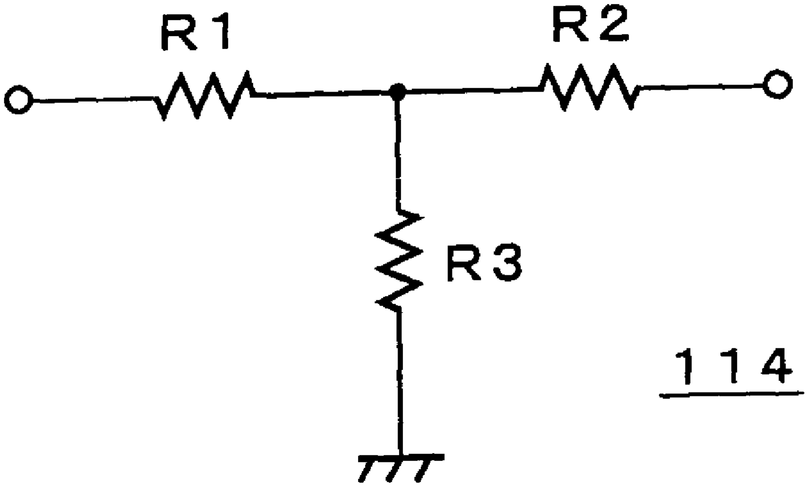
FIGS. 3A and 3B are diagrams each for illustrating a configuration of attenuator.
Figure 3B:
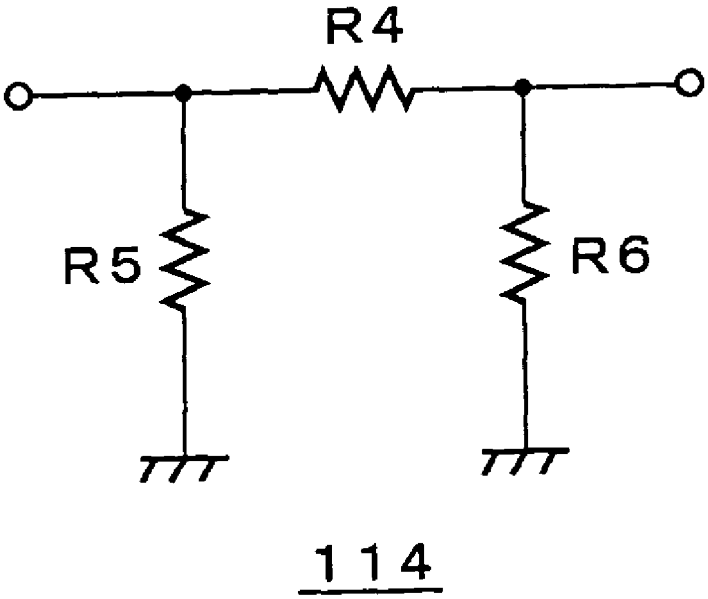

FIGS. 3A and 3B are diagrams each for illustrating a configuration of the attenuator 114. FIG. 3A illustrates a first configuration of the attenuator 114. FIG. 3B illustrates a second configuration of the attenuator 114. As shown in FIGS. 3A, 3B, the attenuator 114 is an attenuating circuit composed of multiple resistors R1 through R3 or R4 through R6. It is to be noted that regarding the configuration of the attenuator 114, this invention is not limited to such the configuration. Any other circuit or element, which may attenuate a signal passing therethrough, may be used as the attenuator 114.

The signal transmission line 115 for connecting another distributing apparatus is wired on the wiring substrate 111 and connected to the port 118 for connecting another distributing apparatus. The signal transmission line 115 is also composed of coplanar line, strip line, or micro-strip line. The signal transmission line 115 is provided with the impedance converter 116 and the switching connector 117.

If two distributing apparatuses 100, 100 are connected through the co-axial cable 130, the impedance converter 116 can make input impedance of the port 118 identical to characteristic impedance of the co-axial cable 130. It is composed of a quarter-wave impedance converter or well-known LC circuit.

The switching connector 117 is switched to a terminal 117*a* connected to the port 118 for connecting another distributing apparatus when co-axial cable 130 is connected to the port 118 to connect this another distributing apparatus. When co-axial cable 130 is not connected to the port 118, the switching connector 117 is switched to a terminal 117*b* connected to the terminator 119 for terminating the signal transmission line 115.

The terminator 119 is composed of chip resistor. An end of the terminator 119 is connected to the terminal 117*b* of the switching connector 117 and the other end thereof is grounded.

The shield case 120 can reduce any adverse effect by noise from outside. In this case, the shield case 120 shields the distributing apparatus 100 with it enclosing the entire circuit thereof including the wiring substrate 111.

Figure 4:
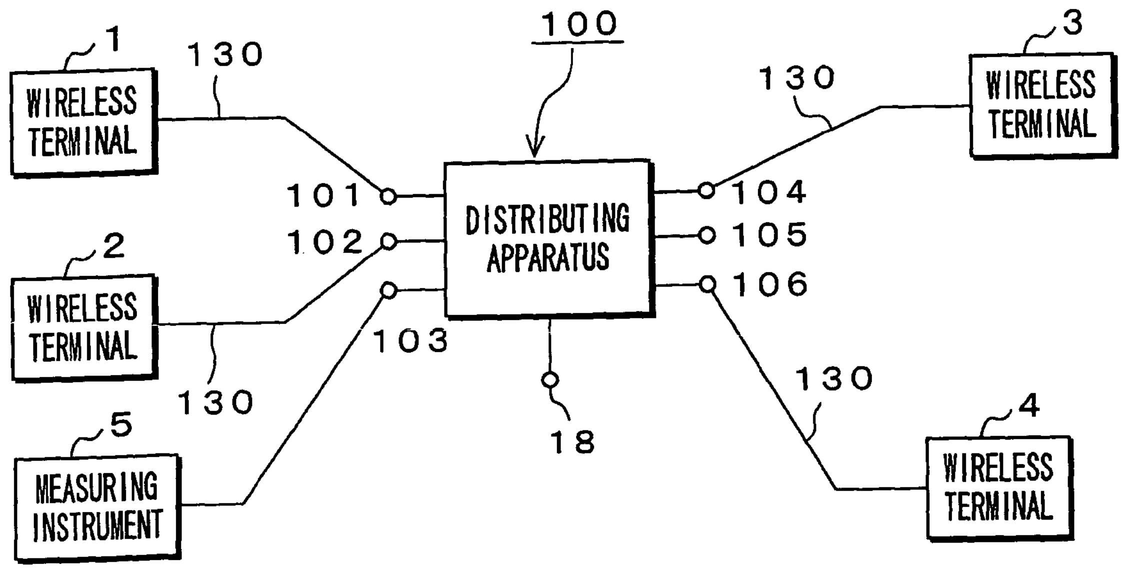
FIG. 4 is a diagram for showing a configuration of a assessment and/or development system of wireless communication using multiple wireless terminals by the use of an embodiment of distributing apparatus according to the invention.

FIG. 4 shows a configuration of an assessment and/or development system of wireless communication using multiple wireless terminals by the use of an embodiment of distributing apparatus 100 according to the invention.

In a case shown in FIG. 4, to the distributing apparatus 100 having six ports 101 through 106, four wireless terminals 1 through 4 may be connected. Such the four wireless terminals 1 through 4 are respectively connected to the distributing apparatus 100 with an input or output terminal of a transmitting-and-receiving module of each of the wireless terminals being connected to any of the ports 101, 102, 104, and 106 of the distributing apparatus 100 by co-axial cables 130. A measuring instrument 5 such as a spectrum analyzer may be connected to a port 103 to measure a signal that is transmitted and/or received through each of the wireless terminals 1 though 4. All of the six ports 101 through 106 of the distributing apparatus 100 share a common characteristic, so that the wireless terminals 1 through 4 and the measuring instrument 5 can be connected to any ports of the distributing apparatus 100 without limiting a connecting method to one shown in FIG. 4. This allows to be implemented a wireless communication using multiple wireless terminals, which is shown in FIG. 1.

In FIG. 4, a port to which no wireless terminal is connected, such as a port 105 is desired to terminate by means of a terminator having a resistance of 50Ω, for example. If, however, large attenuation, for example, −50 dB may occur among the ports 101 through 106, a signal starting from the port 101 to reach at the port 104 through the port 105 has a strength less 50 dB than that of a signal starting from the port 101 to reach at the port 104 directly. Such the signal can be neglected. Thus, if no terminator is connected, it can be sufficient for an assessment and/or development system.

When communicating through the use of the distributing apparatus 100, RF terminals of multiple wireless terminals 1 through 4 are respectively connected to the ports of the distributing apparatus 100, as shown in FIG. 4. One of the multiple wireless terminals 1 through 4, for example, wireless terminal 1, transmits a communication signal. The communication signal propagates through the signal transmission line 112 and the connection node 113 with it being attenuated evenly, so that it can be distributed to another port. This enables the respective wireless terminals 2 through 4 to receive the communication signal under similar condition. It is to be noted that if other wireless terminal transmits a communication signal, the same is true. It is to be noted that if multiple wireless terminals transmit communication signals at the same time, the same is true. This allows the respective wireless terminals to communicate to each other.

Figure 5:
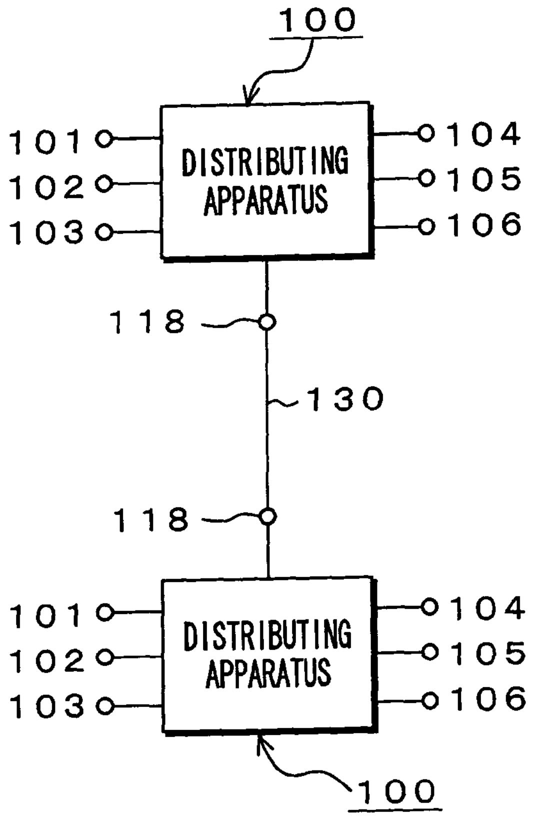
FIG. 5 is a diagram for showing a connection example of two distributing apparatuses.

FIG. 5 shows a connection example of two distributing apparatuses 100, 100. As shown in FIG. 5, if numbers of the wireless terminals to be assessed at the same time is more than numbers of the ports of the distributing apparatus 100, two distributing apparatuses 100, 100 are connected via their ports 118 for connecting another distributing apparatus. This allows the numbers of ports to be increased, thereby increasing numbers of the wireless terminals to be connected at the same time. The wireless terminals that are connected to these two distributing apparatuses 100, 100 can communicate under the same condition.

In this case, in one distributing apparatus 100, if a port transmits a communication signal to the other port, the communication signal sequentially passes through two attenuators 114, 114 along a path of the signal transmission line 112, the attenuator 114, the connection node 113, the attenuator 114, and the signal transmission line 112. On the other hand, if a port transmits a communication signal to the port 118 for connecting another distributing apparatus, the communication signal passes through only one attenuator 114. Thus, when two distributing apparatuses 100, 100 are connected to each other, the communication signal sequentially passes through two attenuators 114, 114 along a path starting from a port of one distributing apparatus 100 to a port of the other distributing apparatus 100 through the port 118. This causes attenuation in the path starting from a port of one distributing apparatus 100 to a port of the other distributing apparatus 100 through the port 118 to be made identical to that between the parts of one distributing apparatus 100.

Thus, in the embodiment, the distributing apparatus 100 includes ports 101 through 106 and six signal transmission lines 112 wired on the wiring substrate 111. An end of each of signal transmission lines 112 is connected to the connection node 113. Each of the six signal transmission lines 112 has the attenuator 114. The attenuators 114 have attenuation identical to each other. One signal transmission line 115 for connecting another distributing apparatus is wired on the wiring substrate 111. An end of the signal transmission line 115 is also connected to the connection node 113. The signal transmission line 115 is provided with the impedance converter 116 and the switching connector 117.

Each of the signal transmission lines 112, 115 is composed of coplanar line, strip line, or micro-strip line. A ground surface is provided between the signal transmission lines.

Therefore, the signal transmission lines share distribution and attenuation functions, thereby avoiding any distinction between the input and output ports. This enables insertion loss between the ports to be fixed, so that the wireless terminals can communicate under similar condition. Combining attenuators into a distributing apparatus allows the inexpensive and downsized distributing apparatus for an assessment and/or development system of wireless communication using multiple wireless terminals to be implemented.

As a result thereof, this can eliminate any necessary for complicated combination of the high-frequency parts such as the attenuators, the distributing apparatus, and the terminator, as in the past case. It is possible to construct the assessment and/or development system of wireless communication using the multiple wireless terminals by merely connecting the wireless terminal to be assessed, to the distributing apparatus. This enables the assessment and/or development to be instinctively implemented with ease in this distributing apparatus.

Providing the port 118 for connecting another distributing apparatus enables two distributing apparatuses 100, 100 to be connected. By connecting distributing apparatuses to each other, if necessary, via a special port therefor, it is possible to increase numbers of connection ports for wireless terminals without varying any attenuation. This allows numbers of the wireless terminals that can be connected at the same time to be increased.

Providing the ground surface between the signal transmission lines enables to be reduced any adverse effect, for example, signal interference in the signal transmission lines 112 with each other. Further, by providing a shield case by which the entire distributing circuit including the wiring substrate 111 is enclosed, it is also possible to reduce any adverse effect by noise from outside.

Figure 6:
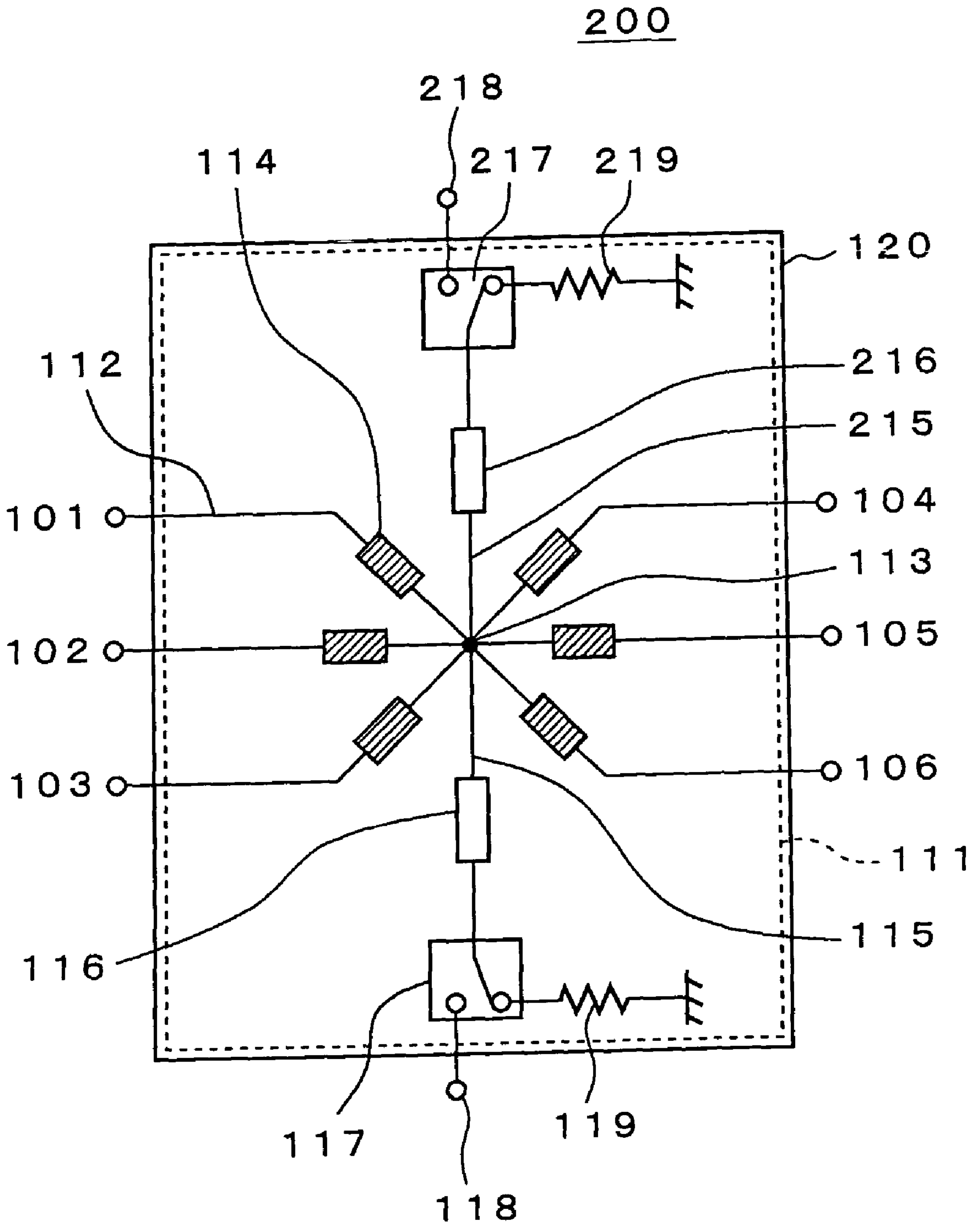
FIG. 6 is a diagram for illustrating a configuration of a second embodiment of distributing apparatus according to the invention.

FIG. 6 illustrates a configuration of a second embodiment of a distributing apparatus 200 according to the invention. The distributing apparatus 200 is adapted for having two ports 118, 218 each for connecting another distributing apparatus. In FIG. 2, like reference numbers are attached to like members corresponding to those shown in FIG. 2, detailed description of which will be omitted.

As shown in FIG. 6, the distributing apparatus 200 includes ports 101 through 106, wiring substrate 111, signal transmission lines 112, a connection node 113, attenuators 114, signal transmission lines 115, 215 each for connecting another distributing apparatus, impedance converters 116, 216, switching connectors 117, 217, ports 118, 218 each for connecting another distributing apparatus, terminators 119, 219 and a shield case 120.

In the distributing apparatus 200, two signal transmission lines 115, 215 each for connecting another distributing apparatus are provided on the wiring substrate 111. Each of the signal transmission lines 115, 215 is provided with the impedance converter 116 or 216, and the switching connector 117 or 217. The ports 118, 218 each for connecting another distributing apparatus are respectively disposed on both sides of the distributing apparatus 200. The ports 118, 218 are respectively connected to the signal transmission lines 115, 215 through the switching connectors 117, 217.

Figure 7:
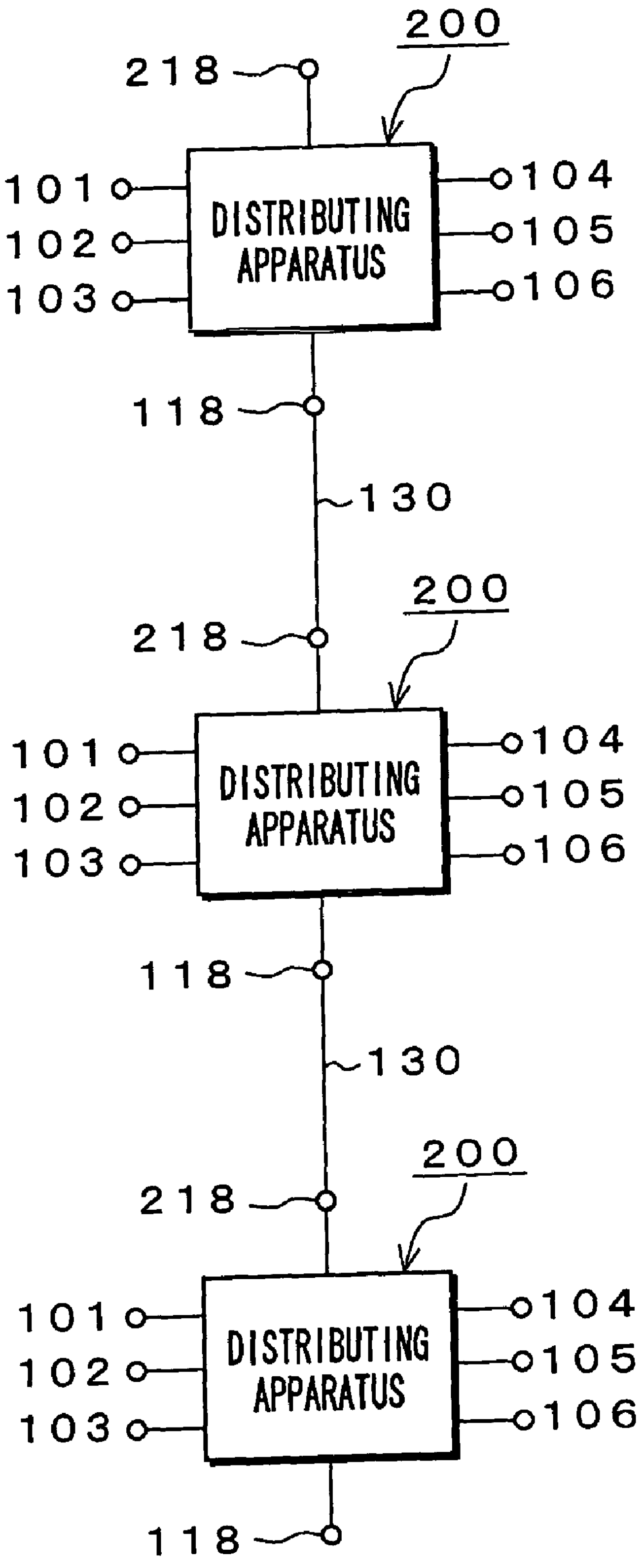
FIG. 7 is a diagram for showing a connection example of multiple (three) distributing apparatuses.

FIG. 7 shows a connection example of multiple distributing apparatuses (more than two distributing apparatuses). As shown in FIG. 7, if there are many wireless terminals to be assessed at the same time so that more than two distributing apparatuses are necessary therefor, three distributing apparatuses 200, 200, 200 are connected to each other with their ports 118, 218 being connected through co-axial cable 130. This allows the numbers of ports to be increased, thereby increasing numbers of the wireless terminals to be connected at the same time. The wireless terminals that are connected to these three distributing apparatuses 200, 200, 200 can communicate under similar condition.

In this case, as the distributing apparatus 100, in the distributing apparatus 200, if a port transmits a communication signal to the other port, the communication signal sequentially passes through two attenuator 114, 114 along a path of the signal transmission line 112, the attenuator 114, the connection node 113, the attenuator 114, and the signal transmission line 112. On the other hand, if a port transmits a communication signal to the port 118 for connecting another distributing apparatus, the communication signal passes through only one attenuator 114. Thus, when the distributing apparatuses 200, 200 are connected to each other, the communication signal sequentially passes through two attenuators 114, 114 along a path starting from a port of one distributing apparatus 200 to a port of the other distributing apparatus 200 through the ports 118, 218. This causes attenuation in the path starting from a port of one distributing apparatus 200 to a port of the other distributing apparatus 200 through the ports 118, 218 to be made identical to that between the ports of one distributing apparatus 200.

Thus, in this embodiment, the distributing apparatus 200 includes ports 101 through 106 and six signal transmission lines 112 wired on the wiring substrate 111. An end of each of the signal transmission lines 112 is connected to the connection node 113. Each of the six signal transmission lines 112 has the attenuator 114. The attenuators 114 have attenuation identical to each other. Two signal transmission lines 115, 215 each for connecting another distributing apparatus are wired on the wiring substrate 111. An end of each of the signal transmission lines 115, 215 is also connected to the connection node 113. Each of the signal transmission lines 115, 215 is provided with the impedance converter 116 or 216 and the switching connector 117 or 217.

Each of the signal transmission lines 112, 115, 215 is composed of coplanar line, strip line, or micro-strip line. A ground surface is provided between the signal transmission lines.

Therefore, the signal transmission lines share distribution and attenuation functions, thereby avoiding any distinction between the input and output ports. This enables insertion loss between the ports to be fixed, so that the wireless terminals can communicate under similar condition. Combining attenuators into a distributing apparatus allows the inexpensive and downsized distributing apparatus for an assessment and/or development system of wireless communication using multiple wireless terminals to be implemented.

As a result thereof, this can eliminate any necessary for complicated combination of the high-frequency parts such as the attenuators, the distributing apparatus, and terminator, as in the past case. It is possible to construct the assessment and/or development system of wireless communication using multiple wireless terminals by merely connecting the wireless terminal to be assessed, to the distributing apparatus. This enables the assessment and/or development to be instinctively implemented with ease in this distributing apparatus.

Providing the two ports 118, 218 each for connecting another distributing apparatus enables more than two distributing apparatuses 200, 200, 200 to be connected. By connecting the distributing apparatuses to each other, if necessary, via a special port therefor, it is possible to increase numbers of connection ports for wireless terminals without varying any attenuation. This allows numbers of the wireless terminals that can be connected at the same time to be increased.

Providing the ground surface between the signal transmission lines enables to be reduced any adverse effect, for example, signal interference in the signal transmission lines 112 with each other. Further, by providing a shield case by which the entire distributing circuit including the wiring substrate 111 is enclosed, it is also possible to reduce any adverse effect by noise from outside.

Thus, although in the above embodiments according to the invention, the distributing apparatus having six ports has been described, this invention is not limited thereto. The number of ports can be set to optional number more than two.

Although in the above embodiments according to the invention, an example of the attenuation of −50 dB between the ports has been described, this invention is not limited thereto.

Although in the above embodiments according to the invention, it has been described that the attenuators 114 positioned on the signal transmission lines 112 have attenuation identical to each other, this invention is not limited thereto. The attenuators 114 may have attenuation different from each other, if necessary.

Thus have been described the distributing apparatus and method for communication that are applied to any cases where when performing the assessment and/or development of a wireless terminal or software therefor, a wireless terminal transmits a signal to and receives a signal from another wireless terminal with a wiring scheme to obtain a communication environment similar to ideal wireless communication environment. It should be understood by those skilled in the art that various modifications, combinations, sub-combinations and alternations may occur depending on design requirements and other factors insofar as they are within the scope of the appended claims or the equivalents thereof.

The invention claimed is:

1. A distributing apparatus that distributes a high-frequency signal received from a transmitting-and-receiving module of a first wireless terminal to transmitting-and-receiving modules of other wireless terminals when the transmitting-and-receiving module of the first wireless terminal transmits an output signal to the transmitting-and-receiving modules of the other wireless terminals with a wiring scheme, said apparatus comprising:

at least four signal transmission lines each transmitting the high-frequency signal, each signal transmission line including an input/output port to the apparatus;

a connecting node to which one end of each of said signal transmission lines is coupled such that said connecting node defines a shared end for all of said signal transmission lines, said shared end being on an opposite end along the signal transmission lines to the input/output port of each of the signal transmission lines such that each of said signal transmission lines being connected to each other said signal transmission line only through said connecting node, said shared end for transmission of signals of each of said transmission lines;

a switch connector for switching between connecting said connecting node to a port for connecting another distribution apparatus and connecting said connecting node to a grounded resistor;

an impedance converter, one end of the impedance converter connecting said shared end, an opposite end of the impedance converter connecting to the switch connector; and an attenuator, in the form of one or more chip resistors with a form factor of an integrated circuit chip, on each of the signal transmission lines and positioned near the connecting node, the attenuator on each signal transmission line attenuating the high-frequency signal.

2. The distributing apparatus according to claim 1, wherein each of the attenuators has the same attenuation.

3. The distributing apparatus according to claim 1, further comprising another signal transmission line having one end connected to the connecting node and another end connectable to another distributing apparatus for connecting the another distributing apparatus to the distributing apparatus.

4. The distributing apparatus according to claim 3, further comprising an impedance converter provided on the another signal transmission line for connecting the another distributing apparatus to the distributing apparatus.

5. The distributing apparatus according to claim 3, further comprising a terminator which terminates the another signal transmission line when an end of the another signal transmission line is not connected to the another distributing apparatus.

6. The distributing apparatus according to claim 1, wherein each of the signal transmission lines is composed of any one of a coplanar line, a strip line, and a micro-strip line; and a ground surface is provided between each of the signal transmission lines.

7. The distributing apparatus according to claim 1, further comprising a shield case enclosing the signal transmission lines, the connecting node, and the attenuators.

8. A method for communication among transmitting-and-receiving modules of multiple wireless terminals with a wiring scheme by using a distributing apparatus having at least four signal transmission lines each transmitting a high-frequency signal, each signal transmission line including an input/output port to the apparatus, a connecting node to which one end of each of said signal transmission lines is coupled such that said connecting node defines a shared end for all of said signal transmission lines, said shared end being on an opposite end along the signal transmission lines to the input/output port of each of the signal transmission lines, a switch connector for switching between connecting said connecting node to a port for connecting another distribution apparatus and connecting said connecting node to a grounded resistor; an impedance converter, one end of the impedance converter connecting said shared end, an opposite end of the impedance converter connecting to the switch connector; and an attenuator, in the form of one or more chip resistors with a form factor of an integrated circuit chip, on each of the signal transmission lines and positioned near the connecting node, the attenuator on each signal transmission line attenuating the high-frequency signal, said shared end for transmission of signals of each of said transmission lines, said method comprising:

connecting one of an input terminal and an output terminal of each of the transmitting-and-receiving modules of the multiple wireless terminals to any one of the signal transmission lines by cable;

coupling said signal transmission lines to said connecting node such that each of said signal transmission lines being connected to each other said signal transmission line only through said connecting node;

transmitting a communication signal from one of the transmitting-and-receiving modules of the multiple wireless terminals; and uniformly distributing a signal to the transmitting-and-receiving modules of the other multiple wireless terminals through the connecting node, the distributed signal being obtained by attenuating the communication signal, thereby allowing the transmitting-and-receiving modules of the other multiple wireless terminals to receive the distributed signal under similar conditions.

* * * * *